United States Patent [19]
Baldwin

[11] Patent Number: 5,165,068
[45] Date of Patent: Nov. 17, 1992

[54] CONTINUOUS-MOTION LINE-ARRAY TELECINE

[75] Inventor: John L. E. Baldwin, Chandlers Ford, Great Britain

[73] Assignee: Rank Cintel Limited, England

[21] Appl. No.: 686,671

[22] Filed: Apr. 17, 1991

[30] Foreign Application Priority Data

Apr. 19, 1990 [GB] United Kingdom ............... 9008766

[51] Int. Cl.⁵ ..................... H04N 3/36; H04N 5/335
[52] U.S. Cl. ................................. 358/214; 358/225
[58] Field of Search ............ 358/214, 54, 225, 50; 359/366

[56] References Cited

U.S. PATENT DOCUMENTS

| | | | |
|---|---|---|---|
| 4,255,764 | 3/1981 | Howe | 358/214 |
| 4,264,921 | 3/1981 | Pennington et al. | 358/50 |
| 4,278,995 | 7/1981 | Fearnside et al. | 358/54 |
| 4,467,361 | 8/1984 | Ohno et al. | 358/212 |
| 5,025,313 | 6/1991 | Parulsaki et al. | 358/214 |

Primary Examiner—Michael Razavi
Assistant Examiner—Wendy R. Greening
Attorney, Agent, or Firm—Ostrolenk, Faber, Gerb & Soffen

[57] ABSTRACT

A continuous-motion line-array telecine images the film image onto three linear array sensors having respective color filters. Vertical scanning is provided by the continuous motion of the film. The sensors can be spaced by an amount equivalent to a given number of line scans for one film and television format combination. To accommodate other formats, a cylindrical lens pair is selectively included, which provides a desired magnification in the vertical direction but not the horizontal direction. The sensor spacing does not then need to be changed and the sensors can be made as an integral device, so that they can be constructed closer together and are likely to have more similar characteristics.

16 Claims, 2 Drawing Sheets

CONTINUOUS-MOTION LINE-ARRAY TELECINE

BACKGROUND OF THE INVENTION

This invention relates to a continuous-motion line-array telecine.

FIG. 1 of the accompanying drawings diagrammatically shows the optical path of a continuous-motion line-array color telecine. FIG. 1 does not represent a particular known telecine but illustrates various features to be found in such telecines. A linear light source 10, which may use a mirror for reinforcement, is used to illuminate uniformly an area of cinematographic film which includes the line to be scanned, with the aid of a condenser system 20. The film is continuously moved at a uniform rate which provides the vertical scan during each film frame. The direction of film motion in the film plane 30 is downwards, as shown in FIG. 1. The arrow A in the film gate represents an upward-pointing arrow in the scene.

An object lens 40 is arranged to focus the film plane 30 onto the image plane 50. For a monochrome telecine a single linear array sensor would be placed on the optical axis at the point 60 with its length perpendicular to the plane of the paper. The light falling on each of the consecutive equispaced elements of the array is proportional to the light transmitted through consecutive equispaced elementary areas in a line on the film.

The details of reading out information from the linear array sensor will not be described in detail, as they will be known to those skilled in the art, but the specific requirements are as follows. During a film frame, the read out of consecutive lines occurs at equal intervals of time, the time interval being chosen so that the vertical spacing of the scanning lines is correct. This requires consideration of the speed of motion of the film, the width of the scanned area on the film, the required aspect ratio and the number of active lines in a frame. If film prints are intended for anamorphic projection the extent of the anamorphic squeeze also needs to be considered.

The film motion causes each film frame to be scanned once in the vertical direction, giving a progressive or non-interlaced line scan, so interlace is produced by writing the information sequentially into a frame store and reading alternate lines from the store on one field and the other lines from the store on the next field. Depending on the standards of the film in terms of film frames per second and the field frequency of the television system the number of field read-outs from the store varies but it is important to maintain the interlace of the signal read out.

It is usual for the ratio of (a) the desired height of the picture to be scanned in the active television lines, to (b) the spacing between like points of successive film frames, to differ from the ratio of the active field duration to the total field duration. This may be most elegantly overcome by starting the line scan operation at the beginning of each frame at the same point with respect to each film frame. However other solutions are possible but they are often only approximations.

The constant velocity of the film provides the motion which results in the vertical scan. However, it may be easier to think of this as providing a motion of the image in the image plane 50. The horizontal scanning of this image occurs in the linear array.

To provide a color telecine the light from the film has to be led to three linear array sensors for the red, green and blue color components, respectively. This could be done by using a splitter block containing dichroic optical filters to provide wavelength-dependent splitting. However, the need for a splitting block may be avoided by placing the three linear array sensors above one another in the image plane, as shown at 61, 62 and 63 respectively in FIG. 1. Each of the three linear array sensors has an optical filter 71, 72, 73 with an appropriate pass-band to make the individual sensors respond to essentially only to red, green and blue light, for sensors 61, 62 and 63 respectively. The order of sensors shown is essentially arbitrary. It should be noted that the figure is not to scale.

FIG. 1 also shows an optical partially-reflecting surface 56, the proportion of light being reflected to that transmitted being either constant or wavelength dependent, which is used to provide an optical path to a fourth linear array sensor 64, which may be a luminance sensor. This sensor is so positioned that it is observing the same line on the film as sensor 62. The number of linear array sensors using the reflecting path need not be limited to one. Indeed there is no absolute limit to the number of sensors using either the direct or the reflecting path.

It will be noted that a single line on the film will first be imaged on the sensor 63. Then, after the film has travelled a short distance, this line on the film will be imaged on sensor 62. Again, after a further short time interval, while the film travels a further short distance, the same line on the film will be imaged on the sensor 61.

At any one instant, the three sensors 61, 62, 63 are responding to light passing through the film along three different lines across the film. It is of course necessary that the light source 10 illuminate all the lines to which, at any time, the sensors are responding. The condenser system is designed with this in mind.

Without correction, the separation between those lines on the film that the sensors are responding to would cause severe vertical misregistration of colors. This misregistration may be decreased by reducing the separation between the sensors, but it can not be completely removed and it is still necessary to compensate for the remaining error. The compensation is achieved by delaying two of the signals by an amount equal in each case to the time by which they would otherwise be advanced with respect to the third signal. These time delays will depend on the velocity of the film, and it is also necessary to arrange that the timing of the start of the line scans of each advanced sensor is such that, when the signal has been delayed to remove the vertical misregistration, the timing of the start of the line of the delayed signal must be the same as that of the signal from the sensor which needs no delay.

The arrangements for this are diagrammatically illustrated in FIG. 1. The output of sensor 61 is applied directly to an output 81 for the R signal. The output of sensor 62 is applied to an output 82 for the G signal through a delay 84 providing a delay of time t. The output of sensor 63 is applied to an output 83 for the B signal through a delay 85 providing a delay of time 2t. Corresponding adjustment has to be made to the control signals used to cause the sensors to start to output a new line. Line scan control circuit 90 produces the necessary scan-control signals. As illustrated, read-out clock signals commanding the sensors to start to output a new line are applied directly to sensor 63, through a delay 91 providing a delay of time t to sensor 62, and through a delay 92 providing a delay of time 2t to sensor 61. The delays 91 and 92 are illustrative only and in practice their functions will be subsumed into the circuit 90.

The need to have different timing for the start of the line scans for the three sensors is disadvantageous, but the separation of the sensors may be varied to alter the required delay. This is used to make the required delays equal to multiples of the line scanning period; so that the same timing can be used for the start of line scanning for all three sensors. For systems where there is a disturbance to the line scan during the vertical blanking period there is a potential fundamental problem with this solution; this will arise if the longest signal delay were greater than the time between the end of scanning the active part of one frame of the film and the beginning of scanning the active part of the next frame.

The same line scan timing for all the sensors has certain benefits. It may make it possible to incorporate all three sensors in one device, leading to significant further benefits. For example, the sensors are likely to have more similar characteristics, reducing the probability of undesired color shading across the width of the picture. Other advantages accrue, for example the sensors can be brought closer to each other, so decreasing the amount of compensating delay.

However, there is the disadvantage that the spacing between the sensors must correspond to an integral number of picture lines on the image plane. This causes problems when the telecine is to be designed to produce television signals to different television standards. The picture line separation depends on the number of active lines of the television standard and on the effective height of the image of the film frame to be scanned. If the picture width is assumed to be constant and the spacing between sensors be 8 lines on a 1250 line 16:9 aspect ratio picture, this spacing would correspond to 6 lines for a 4:3 aspect ratio picture. The same spacing would correspond to 4 lines on a 625 line 16:9 standard and 3 lines if the aspect ratio be 4:3.

However the same spacing would not correspond to an integral number of lines on a 1050 line or 525 line standard with either 16:9 or 4:3 aspect ratios. A different spacing would be required, and yet another would be required for 1125 line 16:9 aspect ratio. Similar problems arise when different film formats are to be scanned.

Sometimes it is convenient to arrange a plurality of sensors with a lower number of elements to behave like a linear array of greater length. These sensors may look at different lines or parts of lines on the film image and the resulting signals combined by means including delays. The sensors may look at different parts of a line but a number of alternative approaches are possible. These include the one in which the sensors respond to every nth column in a picture. In this case, if there were 3 sensors, one would respond to elements in columns 1, 4, 7..., the second to elements in columns 2, 5, 8 ... and the third to elements in columns 3, 6, 9 etc.

In another arrangement, four line array sensors may be used to generate one scanning line. This may be done so as to provide a high resolution along the line scan; if a single array is used for this purpose impossibly high clock speeds are required to empty the array. The four arrays are arranged in a so-called castellated form, with the first and third arrays at one vertical position and the second and fourth arrays at a slightly different vertical position. This avoids any discontinuity at the transition points. Appropriate electronic delays are of course required. However, it will be apparent that there is again a situation where arrays which are supposed to relate to a single scanning line are spaced apart in the direction of film movement. The same problem as just discussed for a color device will thus apply for this monochrome device if it is attempted to accommodate multiple standards or formats.

An important case would be the use of this castellated approach providing improved definition for the luminance component in combination with the more normal approach for the color components where definition is, by comparison, less important.

SUMMARY OF THE INVENTION

According to the present invention, there is provided a continuous-motion line-array color telecine, comprising a light source, means for continuously driving a cinematographic film through a film plane, means for illuminating at least part of the film plane with light from the light source, line array light sensor means, and a lens system for imaging the illuminated film plane on the line array light sensor means. The line sensor means has multiple line array sensors arranged with their length transverse to the direction of movement of the film image in the film plane and spaced apart in the direction of film movement. The lens system includes at least two astigmatic components such that the image magnification in the direction of film movement can be varied relative to that transverse to the film movement without deleteriously affecting the focus of the system.

The astigmatic components can provide a "zoom" function to alter the registration between the images or can be selectively removable from the optical path, manually or by means of a motor. Conveniently the astigmatic components will comprise converging and diverging cylindrical lens elements.

The line sensor means may advantageously take the form of a unitary device, as the individual line sensors only need now to have one fixed spacing. This means that they are more likely to have similar characteristics.

By use of this invention a telecine design may be realised which can be used on a variety of standards and of transmitted picture aspect ratios, including for example 525 and 625 lines per picture at 4:3 aspect ratio, and 1050, 1125 and 1250 lines per picture at 16:9 aspect ratio.

BRIEF DESCRIPTION OF THE DRAWINGS

The invention will now be described in more detail, by way of example, with reference to the drawings, in which.

DESCRIPTION OF THE PREFERRED EMBODIMENT

Figure 1:
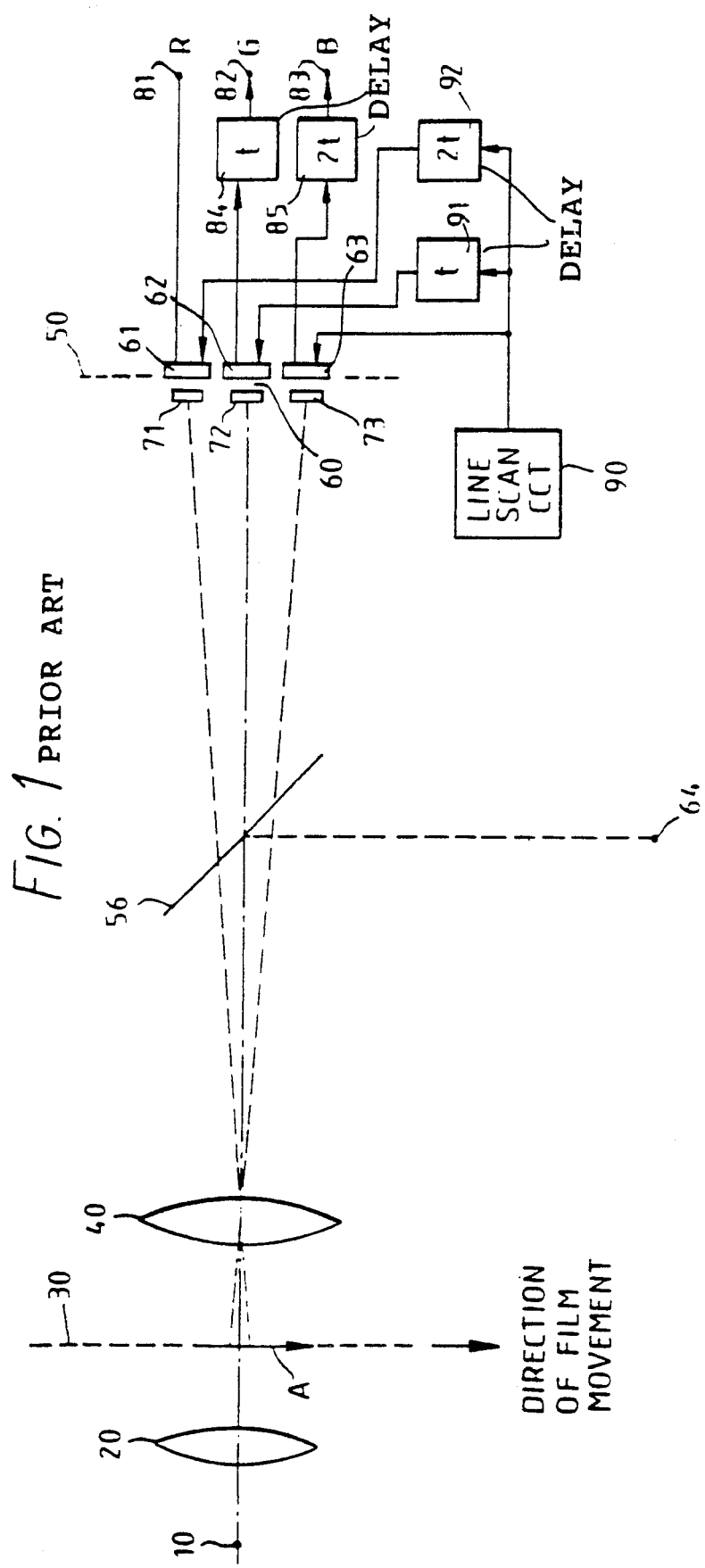
FIG. 1 (referred to above) illustrates a known continuous-motion line-array color telecine.
Figure 2:
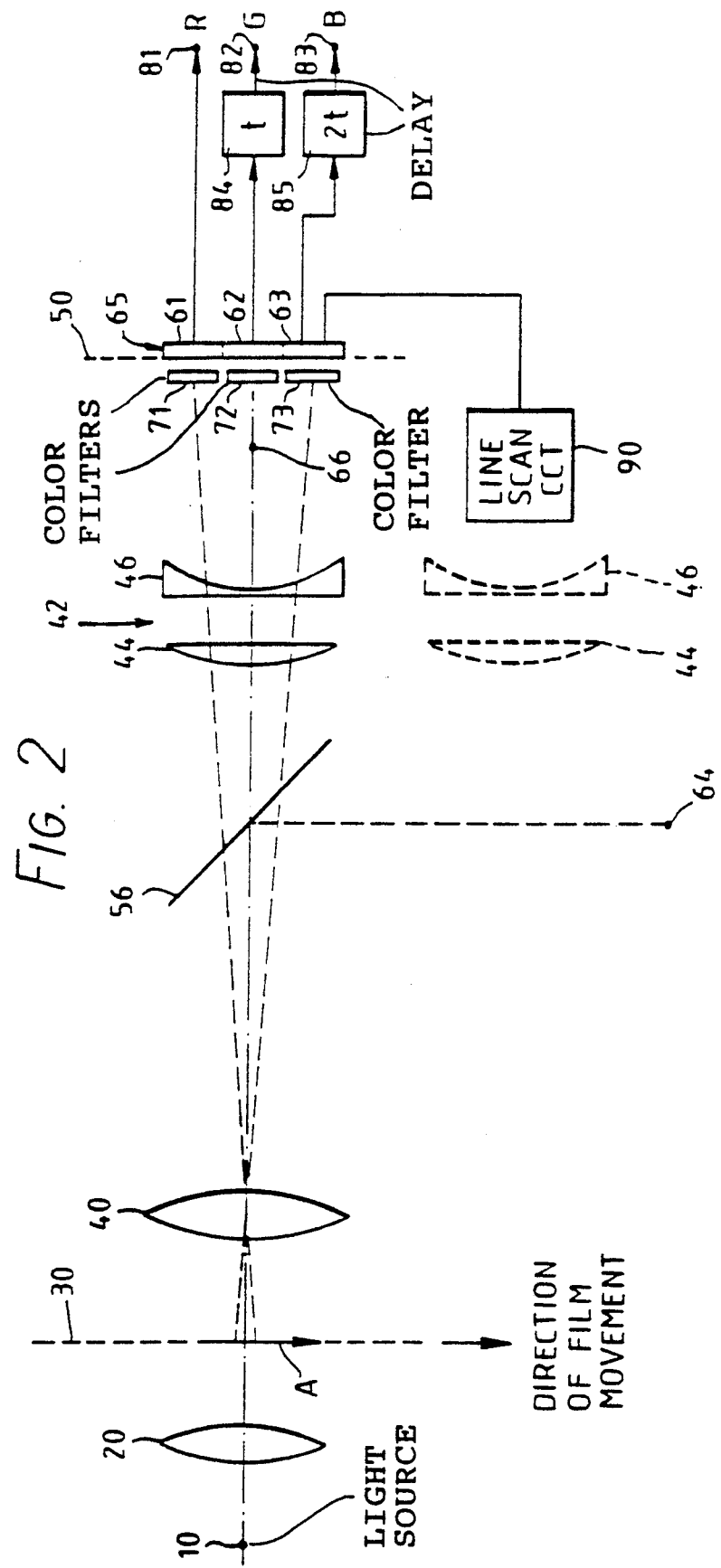
FIG. 2 illustrates a continuous-motion line-array color telecine embodying the invention.

Similarly to FIG. 1, FIG. 2 is a diagrammatic side view of the optical path of a continuous-motion line-array color telecine. It must again be emphasized that FIG. 2 is not to scale, but is intended to illustrate the construction of the telecine to those skilled in the art. Corresponding parts are identified by the same reference numerals in the two figures.

A light source 10, of known type illuminates a film plane 30 by means of a condenser 20. A known film transport system (not shown) moves the film continuously and uniformly in the downward direction as seen in the figure. A lens system comprising an objective lens 40 images the film onto the image plane 50. In the image plane is a unitary sensor array device 65, comprising the three line-array sensors 61, 62 and 63. Color filters 71, 72 and 73 pass just the red, green and blue light components, respectively, to the sensors 61, 62 and 63. The output of the sensor 61 is applied directly to a red output 81; the output of sensor 62 is applied through a t delay 84 to a green output 82; and the output of sensor 63 is applied through a 2t delay 85 to a blue output 83. The delay time t is an integral number of line scans. Provided that the separation between the bottom of the desired picture area on one film frame and the top of the area on the next frame is sufficient to simultaneously span all the line arrays 61 to 63, then all the arrays may be served by a common line scanning system 90. If desired, the partially-reflective mirror 56 and further sensor(s) 64 may also be included.

In accordance with the invention, an optical system 42 is included between the objective 40 and the image plane 50. The optical system provides a variable magnification in the vertical direction, i.e. the direction of film motion, so that the spacing between the lines on the film that the red, green and blue line arrays are respectively sensing is always an integral multiple of the desired spacing of the line scans on the film. Looking at it another way, the optical system 42 "magnifies" the separation of the linear array sensors so that their effective separation is always a multiple of the desired spacing of the scanning lines at the image plane. Either way, only integral line delays are required to achieve registration of the red, green and blue images.

As is clear from the above discussion, a change in the number of lines in the scanning standard, or in its aspect ratio, will have the effect of causing a change of line spacing at the image plane. By introducing a change of magnification (together, possibly, with integral changes in the number of lines of delay, as discussed below), registration of the lines at the sensor array device 65 can be maintained.

The optical system 42 is cylindrical, so that it does not affect the magnification in the direction perpendicular to the plane of the paper. Thus it has an astigmatic effect. The effect of this cylindrical lens system increases with its separation from the image plane.

Unfortunately, if a simple lens such as lens 44 is used as the optical system 42, the magnification of the separation between array sensors is accompanied by a change of focus, dependent upon the magnification. The point 66 illustrates where a line, which would otherwise be imaged on sensor 62, now comes to a line focus. Of course, information in the perpendicular (horizontal) direction still is focused at the original position of the array sensor 62. (This statement ignores the thickness of lens 44.)

However, by using a pair of cylindrical lenses 44, 46 of opposite sign (convex and concave respectively), it is possible to "magnify" the separation between the image sensors, while maintaining the required focus. If the separation of the two lenses 44, 46 can be altered, as the pair as a whole is moved, then a change of magnification can be realized while maintaining the focus. The order of the lenses is not mandatory and in practice it may often be convenient to use two lenses of one type with a lens of the opposite type in between.

In effect the combination of lenses can be considered as a zoom lens but in the vertical direction only.

It is not necessary that the required properties be provided entirely by a separate optical system, since they can be combined with the normal imaging characteristics of the objective lens (40). The combined lens form is particularly convenient when used in combination with the partially reflecting surface 56. This would be relevant when a number of sensors is used, in, say, the reflecting path to provide, for example, luminance at high definition, while the other path is used for some other purpose, such as providing color information at half the definition.

However, whatever form it may take, the overall optical system, imaging the film onto the several linear array sensors, will always include at least two astigmatic elements.

It will be appreciated by those skilled in the art that the same principles may be used to realize this method by using reflecting surfaces rather than surfaces which refract.

The extent to which the magnification in the vertical direction needs to change is determined by a number of factors, but generally it will be much less if it only has to allow for the non-integer part of the number of lines that corresponds to the separation of the sensors.

As an example, suppose the number of lines in three television systems be 1050, 1125 and 1250, all other parameters being the same, and that the physical spacing between the sensors be 21, 22.5 and 25 picture lines respectively on the three standards. If only a compensating delay of 21 lines is possible, then the optical magnification of the image in the vertical direction will need to be 45/42 and 25/21, for 1125 and 1250 lines respectively; a maximum change of about 19%.

On the other hand, if compensating delays of 21, 22 and 25 lines were available, then both systems of 1050 and 1250 lines can be handled at standard vertical magnification using compensating delays of 21, and 25 lines, respectively, and it is only the 1125 format which will require a vertical image magnification increased by 45/44, if a compensating delay of 22 lines by used; a change of magnification of about 2.3%. The optical system can thus be constructed with lenses 44, 46 which are selectively insertable into and removable from the optical path (shown in phantom in FIG. 2), or in such a way that it can be "zoomed" between two positions one of which does not provide extra magnification and the other of which does. It will be appreciated that although the term magnification factor tends to imply a factor greater than unity, it is used in this description without such an implication; for example, a reduction to 0.9 would have been considered a magnification of 0.9.

As accommodation for the different formats is now achieved optically the unitary sensor device 65 can be used with the advantages accruing from having all three sensors formed on one device.

In some cases, such as when it is desired to scan at high definition for luminance and at half the definition for the coloring information, it may be advantageous to use a change of vertical optical magnification, not for the non-integer part but for the remainder left when the number of lines that corresponds to the separation of the sensors is divided by two.

It will be appreciated that the principles described are applicable to a luminance sensor of the castellated type as described above. Such a luminance sensor may be included in the reflected path.

What is claimed is:

1. In a continuous-motion line-array telecine, the combination comprising:
   a light source;
   means for continuously driving a cinematographic film through a film plane along a first direction;
   means for illuminating at least part of said film plane with light from said light source;
   line array light sensor means; and
   a lens system for imaging said illuminated film plane on said line array light sensor means;
   said line array light sensor means having a plurality of longitudinally extending line array sensors, each line array sensor being arranged with its longitudinal dimension extending along a second direction transverse to said first direction and being spaced apart from the remaining line array sensors in said first direction;
   said lens system including at least two astigmatic components, said lens system varying an image magnification in said first direction relative to an image magnification in said second direction without deleteriously affecting the focus of the system.

2. Apparatus according to claim 1, in which said telecine is adapted to operate selectively with multiple standards, the spacing of said line array sensors in the direction of film movement correspond to a non-integral multiple of a first desired line spacing, said apparatus including delay means coupled to the outputs of the line array sensors and providing delays corresponding to an integral number of line spacings to compensate for the integral part of said non-integral multiple, and said astigmatic components being adapted to compensate for the fractional part of said non-integral multiple.

3. Apparatus according to claim 1, in which said line array light sensor means includes a unitary device in which said line array sensors are arranged with a fixed spacing.

4. Apparatus according to claim 2, in which said line array light sensor means includes a unitary device in which said line sensors are arranged with a fixed spacing.

5. Apparatus according to claim 1, in which said lens system has a zoom function.

6. Apparatus according to claim 1, in which said lens system comprises lens elements which are removable out of an optical path of said lens system.

7. Apparatus according to claim 1, in which said astigmatic components comprise converging and diverging cylindrical elements.

8. Apparatus according to claim 1, further including a partially-reflective surface located between said film plane and said line array light sensor means, to provide transmitted and reflected light beams, and including second sensor means, one of said line array light sensor means and said second sensor means receiving said transmitted beam and the other receiving said reflected beam.

9. Apparatus according to claim 1, in which there are three said line array sensors sensitive to red, green and blue light, respectively.

10. Apparatus according to claim 1, in which the said line array sensors are sensitive to luminance.

11. In a continuous-motion line telecine, the combination comprising:
    means for continuously driving a cinematographic film through a film plane along a first direction;
    means for illuminating at least part of said film plane with light;
    line-array light sensor means; and
    a lens system for imaging said illuminated film plane on said line-array light sensor means;
    said line-array light sensor means having a plurality of longitudinally-extending line-array sensors, each line-array sensor being arranged with its longitudinal dimension extending along a second direction transverse to said first direction and being spaced apart from the remaining line-array sensors in said first direction; and
    said lens system providing a different magnification in said first direction than in said second direction.

12. Apparatus according to claim 11, wherein said lens system varies an image magnification in said first direction, but not in said second direction.

13. A continuous-motion line-array telecine, comprising:
    a light source;
    means for continuously driving a cinematographic film through a film plane along a first direction;
    means for illuminating at least part of said film plane with light from said light source;
    line array light sensor means;
    a lens system for imaging said illuminated film plane on said line array light sensor means;
    said line array light sensor means having three line array sensors sensitive to red, green and blue light, respectively, each of said line array sensors extending longitudinally in a second direction, transverse to said first direction, and being spaced apart from the remaining line array sensors in said first direction; and
    said lens system including two cylindrical lens components, said lens system varying in image magnification in said first direction relative to an image magnification in said second direction without deleteriously affecting the focus of said system.

14. A telecine according to claim 13, in which said telecine is adapted to operate selectively with multiple standards whereby for at least one said standard the spacing in the direction of film movement of said three line array sensors corresponds to a non-integral multiple of the desired line spacing, said apparatus including delay means coupled to the outputs of the line array sensors and providing delays corresponding to an integral number of line spacings to compensate for the integral part of said non-integral multiple, and said cylindrical lens components being adapted to compensate for the fractional part of said non-integral multiple.

15. A telecine according to claim 13, in which said line array light sensor means includes a unitary device in which said line sensors are arranged with a fixed spacing.

16. A telecine according to claim 14, in which said line array light sensor means includes a unitary device in which said line sensors are arranged with a fixed spacing.

* * * * *